US012191971B2

(12) United States Patent
Xu et al.

(10) Patent No.: US 12,191,971 B2
(45) Date of Patent: Jan. 7, 2025

(54) ELECTRONIC DEVICE, WIRELESS COMMUNICATION METHOD AND COMPUTER-READABLE STORAGE MEDIUM

(71) Applicant: Sony Group Corporation, Tokyo (JP)

(72) Inventors: Wei Xu, Jiangsu (CN); Shaoqing Zhou, Jiangsu (CN); Zhikun Wu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 349 days.

(21) Appl. No.: 17/790,582

(22) PCT Filed: Feb. 10, 2021

(86) PCT No.: PCT/CN2021/076417
§ 371 (c)(1),
(2) Date: Jul. 1, 2022

(87) PCT Pub. No.: WO2021/164676
PCT Pub. Date: Aug. 26, 2021

(65) Prior Publication Data
US 2023/0040183 A1 Feb. 9, 2023

(30) Foreign Application Priority Data
Feb. 18, 2020 (CN) .......................... 202010100127.6

(51) Int. Cl.
H04B 7/145 (2006.01)
H04B 7/06 (2006.01)
H04B 17/318 (2015.01)

(52) U.S. Cl.
CPC ........... H04B 7/145 (2013.01); H04B 7/0695 (2013.01); H04B 17/318 (2015.01)

(58) Field of Classification Search
CPC .... H04B 7/145; H04B 7/0695; H04B 17/318; H04B 7/15528; H04B 7/0696; H04B 7/04013; H04B 1/1027; H04B 1/1036
See application file for complete search history.

(56) References Cited

U.S. PATENT DOCUMENTS 5,444,776 A * 8/1995 Sheets ................. H04L 25/0272
379/22.08
5,991,345 A * 11/1999 Ramasastry ....... H04B 7/18534
370/320

(Continued)

FOREIGN PATENT DOCUMENTS

CN 108702726 A 10/2018
CN 109842437 A 6/2019

(Continued)

OTHER PUBLICATIONS

Basar Ertugrul et al: "Wireless Communications Through Reconfigurable Intelligent Surfaces", IEEE Access, IEEE, USA, vol. 7, Aug. 13, 2019 (Aug. 13, 2019), pp. 116753-116773, XP011742786.

(Continued)

Primary Examiner — Dominic E Rego
(74) Attorney, Agent, or Firm — XSENSUS LLP

(57) ABSTRACT

An electronic device according to the present disclosure includes a processing circuit configured to: determine an interference user according to multiple available passive signal reflection apparatuses of user equipment; determine a set of available beam pairs according to the multiple available passive signal reflection apparatuses of the user equipment; select an available beam pair from the set of available beam pairs according to the reception signal quality of the user equipment and the reception signal quality of the interference user; and adjust, into two beams, the reflecting directions of two available passive signal reflection apparatuses to which the two beams in the selected available beam (Continued)

pair belong. By using the electronic device, the wireless communication method and the computer-readable storage medium according to the present disclosure, the reflecting direction of a passive signal reflection apparatus can be reasonably selected, thereby reducing interference to cell users while improving communication quality.

20 Claims, 12 Drawing Sheets

(56) References Cited

U.S. PATENT DOCUMENTS

| | | | | |
|---|---|---|---|---|
| 10,310,066 | B1* | 6/2019 | Zatman | G01S 13/46 |
| 10,929,622 | B1* | 2/2021 | O'Hagan | G06K 19/07709 |
| 2002/0088005 | A1* | 7/2002 | Wu | H04L 5/0044 |
| | | | | 725/129 |
| 2003/0201940 | A1* | 10/2003 | Chiang | H01Q 3/24 |
| | | | | 343/700 MS |
| 2008/0088416 | A1* | 4/2008 | Crooks | G06K 7/0008 |
| | | | | 340/10.6 |
| 2012/0040660 | A1* | 2/2012 | Clevorn | H01Q 1/246 |
| | | | | 455/422.1 |
| 2017/0146652 | A1* | 5/2017 | Jackson | G01S 7/411 |
| 2018/0306849 | A1* | 10/2018 | Carroll | H04B 3/46 |

FOREIGN PATENT DOCUMENTS

| | | |
|---|---|---|
| CN | 110012547 A | 7/2019 |
| CN | 110225538 A | 9/2019 |
| CN | 110266352 A | 9/2019 |
| CN | 110392438 A | 10/2019 |
| KR | 20180133630 A | 12/2018 |

OTHER PUBLICATIONS

Qingqing Wu:"Intelligent Reflecting Surface Enhanced Wireless Network via Joint Active and Passive Beamforming", IEEE Transactions on Wireless Communications,,vol. 18, No. 11,Nov. 1, 2019 (Nov. 1, 2019). pp. 5394-5409, XP002804813.
International Search Report and Written Opinion mailed on May 10, 2021, received for PCT Application PCT/CN2021/076417, filed on Feb. 10, 2021, 9 pages including English Translation.
Taha et al., "Enabling Large Intelligent Surfaces with Compressive Sensing and Deep Learning", arXiv:1904.10136v2, Apr. 30, 2019, pp. 1-33.
Wu et al., "Intelligent Reflecting Surface Enhanced Wireless Network via Joint Active and Passive Beamforming" IEEE Transactions on Wireless Communications, vol. 18, No. 11, Nov. 30, 2019, pp. 1-16.

* cited by examiner

ELECTRONIC DEVICE, WIRELESS COMMUNICATION METHOD AND COMPUTER-READABLE STORAGE MEDIUM

CROSS-REFERENCE TO RELATED APPLICATIONS

This application is based on PCT filing PCT/CN2021/076417, filed Feb. 10, 2021, which claims priority to Chinese Patent Application No. 202010100127.6, titled "ELECTRONIC DEVICE, WIRELESS COMMUNICATION METHOD AND COMPUTER-READABLE STORAGE MEDIUM", filed on Feb. 18, 2020 with the China National Intellectual Property Administration, each of which is incorporated herein by reference in its entirety

TECHNICAL FIELD

The embodiments of the present disclosure relates to the field of wireless communications, and in particular to an electronic device, a wireless communication method, and a computer-readable storage medium. More specifically, the present disclosure relates to an electronic device as a network side device in a wireless communication system, a wireless communication method performed by a network side device in a wireless communication system, and a computer-readable storage medium.

BACKGROUND

A passive signal reflection device adjusts an amplitude and/or a phase of an incident signal and performs passive reflection by using a large number of low-energy and low-cost reflection elements that are integrated on a plane, thereby realizing reconfiguration of the wireless propagation environment and enhancing the communication quality. The passive signal reflection device has a good development prospect.

It is required for the passive signal reflection device to obtain channel state information between the passive signal reflection device and a base station/a user equipment to provide performance gain for a wireless communication system. However, due to the hardware limitation of the passive signal reflection device, the passive signal reflection device is incapable of sensing channels. The equivalent channels of indirect links between the user equipment, the passive signal reflection device and the base station may be estimated based on training signals received by the base station equipment. The number of reflection states of the passive signal reflection device is related to the number and accuracy of the reflection elements. With the increase of the reflection states, the complexity and overhead of estimating the equivalent channels increase.

Further, since the passive signal reflection device is incapable of sensing channels, the conventional solutions such as beam forming and beam tracking based on channel state information cannot be used. In addition, although the passive signal reflection device may theoretically adjust the amplitude and/or the phase of the incident signal, the conventional passive signal reflection device can only adjust the phase and cannot adjust the amplitude, resulting in serious interference between user equipment in a cell.

Therefore, it is required to provide a technical solution to reasonably determine a reflection direction of the passive signal reflection device, thereby reducing interference of a user equipment to other user equipment in a cell while enhancing the communication quality of the user equipment.

SUMMARY

A brief summary of the present disclosure is provided hereinafter, rather than a comprehensive disclosure of the full scope of the present disclosure or all features of the present disclosure.

According to the present disclosure, an electronic device, a wireless communication method and a computer-readable storage medium are provided to reasonably determine a reflection direction of the passive signal reflection device, thereby reducing interference of a user equipment to other user equipment in a cell while enhancing the communication quality of the user equipment.

According to an aspect of the present disclosure, an electronic device is provided. The electronic device includes processing circuitry. The processing circuitry is configured to: determine an interfered user based on multiple available passive signal reflection devices of a user equipment, where the interfered user is interfered by at least one of the available passive signal reflection devices; determine a set of available beam pairs based on the multiple available passive signal reflection devices of the user equipment, where two beams in each of the available beam pairs are available beams of two available passive signal reflection devices; select an available beam pair from the set of the available beam pairs based on received signal quality of the user equipment and received signal quality of the interfered user; and adjust reflection directions of two available passive signal reflection devices, corresponding to two beams in the selected available beam pair, to be respectively consistent with directions of the two beams, where the two available passive signal reflection devices reflect signals from the electronic device to the user equipment by using the two beams respectively.

According to another aspect of the present disclosure, a wireless communication method is provided. The method includes: determining an interfered user based on multiple available passive signal reflection devices of a user equipment, where the interfered user is interfered by at least one of the available passive signal reflection devices; determining a set of available beam pairs based on the multiple available passive signal reflection devices of the user equipment, where two beams in each of the available beam pairs are available beams of two available passive signal reflection devices; selecting an available beam pair from the set of the available beam pairs based on received signal quality of the user equipment and received signal quality of the interfered user; and adjusting reflection directions of two available passive signal reflection devices, corresponding to two beams in the selected available beam pair, to be respectively consistent with directions of the two beams, where the two available passive signal reflection devices reflect signals from the electronic device to the user equipment by using the two beams respectively.

According to another aspect of the present disclosure, a computer-readable storage medium is provided. The computer readable storage medium includes executable computer instructions. The executable computer instructions, when executed by a computer, cause the computer to perform the wireless communication method according to the present disclosure.

According to another aspect of the present disclosure, computer instructions are provided. The executable computer instructions, when executed by a computer, cause the computer to perform the wireless communication method according to the present disclosure.

With the electronic device, the wireless communication method and the computer-readable storage medium according to the present disclosure, one beam pair can be selected from multiple available beam pairs based on the received signal quality of the user equipment and the received signal quality of the interfered user, so that the passive signal reflection devices can reflect signals to the user equipment by using the selected beam pair. In this way, the received signal quality of the user equipment can be enhanced, and the interference to interfered users can be reduced.

Further areas of applicability will become apparent from the description provided herein. Descriptions and examples in this summary are only schematic and are not intended to limit the scope of the present disclosure.

BRIEF DESCRIPTION OF THE DRAWINGS

The drawings described herein only illustrate the selected embodiments, rather than all embodiments. The drawings are not intended to limit the scope of the present disclosure. In the drawings:

FIG. 5(*b*) is a schematic diagram showing a relationship between a received signal and a transmitting signal after an amplify-and-forward relay performs signal forwarding;

Figure 1:
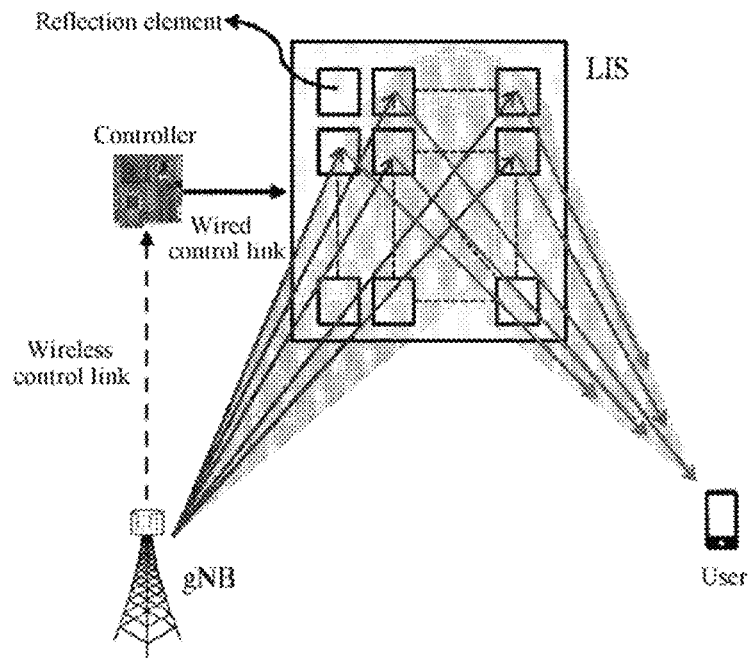
FIG. 1 is a schematic diagram showing an operation mode of a passive signal reflection device.

Although the present disclosure is susceptible to various modifications and alternative forms, specific embodiments thereof have been shown in the drawings as examples and are described in detail herein. However, it should be understood that the description of specific embodiments herein is not intended to limit the present disclosure to the particular forms disclosed, but rather to cover all modifications, equivalents and alternatives that fall within the spirit and scope of the present disclosure. It should be noted that same or similar reference numerals are used throughout the drawings to refer to the same or like parts.

DETAILED DESCRIPTION

The embodiments of the present disclosure will be described completely in conjunction with the drawings. The following description is only exemplary, and is not intended to limit the present disclosure, and applications or usages thereof.

Exemplary embodiments are provided so that the present disclosure will be thorough and complete, and will fully convey the scope of the present disclosure to those skilled in the art. Numerous specific details, such as examples of specific components, devices, and methods, are described to provide a detailed understanding of the embodiments of the present disclosure. It is apparent for those skilled in the art that the exemplary embodiments may be implemented in many different forms without specific details, and should not be construed to limit the scope of the present disclosure. In some exemplary embodiments, well-known processes, well-known structures, and well-known technologies are not described in detail.

The descriptions are provided in the following order:
1. Description of problems;
2. Configuration examples of a network side device;
3. Method embodiments; and
4. Application examples.

1. DESCRIPTION OF PROBLEMS

FIG. 1 is a schematic diagram showing an operation mode of a passive signal reflection device. In FIG. 1, an LIS (Large Intelligent Surface) is taken as an example to illustrate the operation mode of the passive signal reflection device. The LIS includes multiple reflection elements (shown by squares in FIG. 1). A gNB controls a controller through a wireless control link, and the controller controls a reflection direction of the LIS through a wired control link. The gNB transmits a downlink signal to the LIS, and the LIS reflects the downlink signal to the user under the control of the controller. Thus, the gNB may communicate with the user via the LIS.

Figure 2:
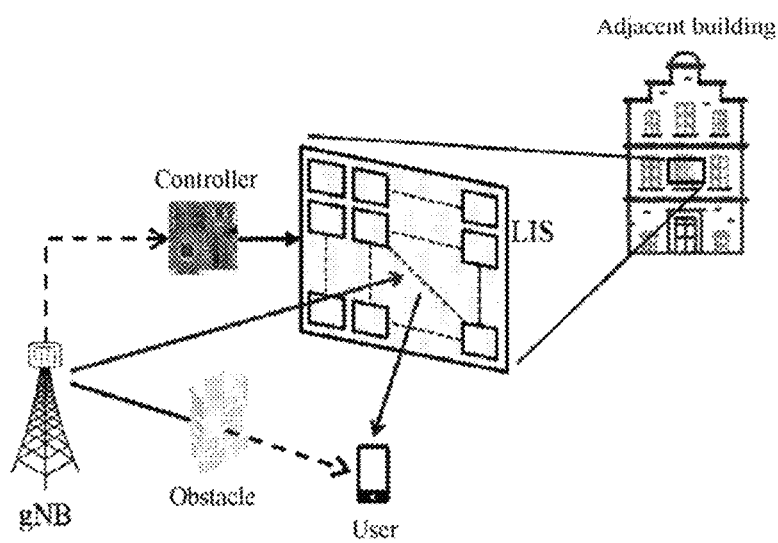
FIG. 2 is a schematic diagram showing an operation mode of a passive signal reflection device in a case that a direct link between a gNB (base station equipment in a 5G communication system) and a user is blocked.

FIG. 2 is a schematic diagram showing an operation mode of a passive signal reflection device in a case that a direct link between a gNB and a user is blocked. As shown in FIG.

2, a direct link between the gNB and the user is blocked by an obstacle, and an LIS is arranged on a building between the gNB and the user. The gNB may control the reflection direction of the LIS by using a wireless controller, and then transmits a downlink signal to the LIS. The LIS reflects the downlink signal to the user along the reflection direction controlled by the gNB. Therefore, although the direct link between the gNB and the user is blocked, the gNB may transmit the downlink signal to the user via a gNB-LIS-user indirect link, thereby improving the communication quality.

Figure 3:
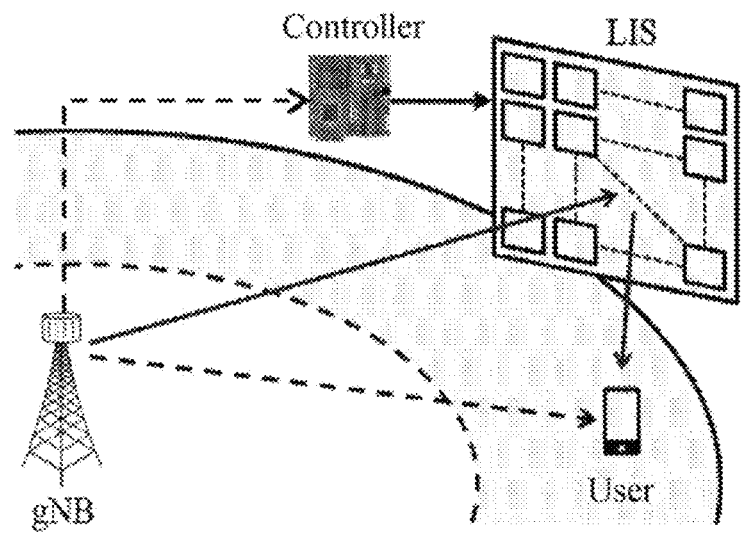
FIG. 3 is a schematic diagram showing an operation mode of a passive signal reflection device in a case that a user is located at an edge of a cell.

FIG. 3 is a schematic diagram showing an operation mode of a passive signal reflection device in a case that a user is located at an edge of a cell. As shown in FIG. 3, a solid line arc represents a boundary of a coverage of a gNB, and a dotted line arc represents a boundary of a center coverage of the gNB. As shown in FIG. 3, the user is located at the edge of the coverage of the gNB, so that the signal reception quality is poor. An LIS is arranged at the edge of the coverage of the gNB. The gNB may control the reflection direction of the LIS by using the wireless controller, and then transmits a downlink signal to the LIS. The LIS reflects the downlink signal to the user along the reflection direction controlled by the gNB. Therefore, the user may receive a signal via a direct link between the gNB and the user, and may receive a signal reflected by the LIS, so that the user may combine the two received signals to improve the signal reception quality.

Figure 4:
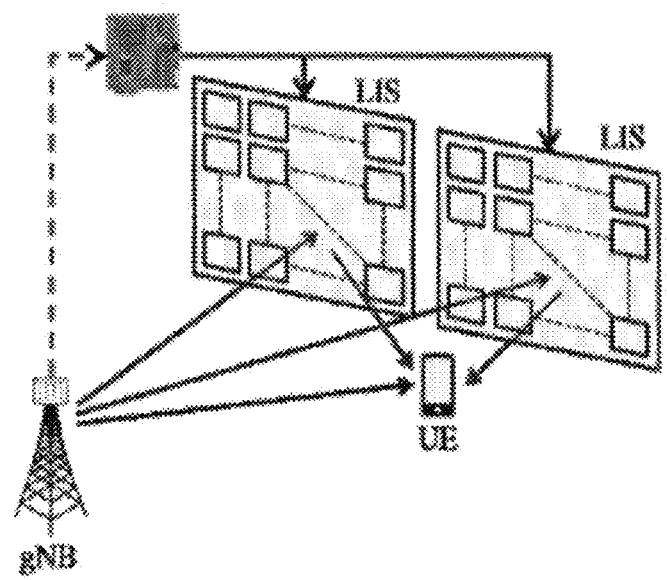
FIG. 4 is a schematic diagram of an MIMO communication with a passive signal reflection device.

FIG. 4 is a schematic diagram of an MIMO communication with a passive signal reflection device. In FIG. 4, there are two LISs, and the gNB may control the reflection directions of the two LISs by using the wireless controller. That is, the user may receive a signal via a direct link between the gNB and the user, and may receive a signal reflected by each of the two LISs. Therefore, the MIMO communication may be realized. In the conventional MIMO communication, a serious path loss exists in a high frequency band, it is generally difficult to obtain multiple paths, and a direct path is mainly used, resulting in inability to achieve the performance gain of MIMO. However, in an MIMO communication with LISs, multiple LISs provide multiple propagation paths, so that there are multi-rank equivalent channels between the gNB and the user even in a high frequency band, thereby realizing high frequency MIMO communication in LIS-enhanced communication.

Figure 5:
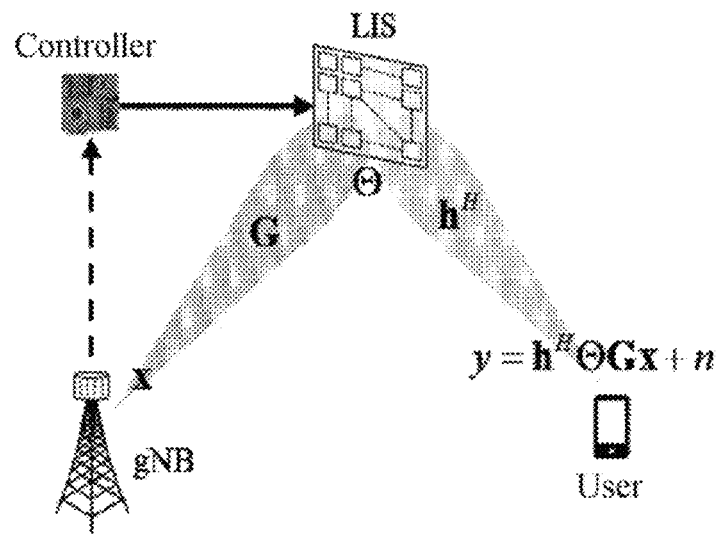
FIG. 5(*a*) is a schematic diagram showing a relationship between a received signal and a transmitting signal after a passive signal reflection device performs signal reflection.
Figure 5:
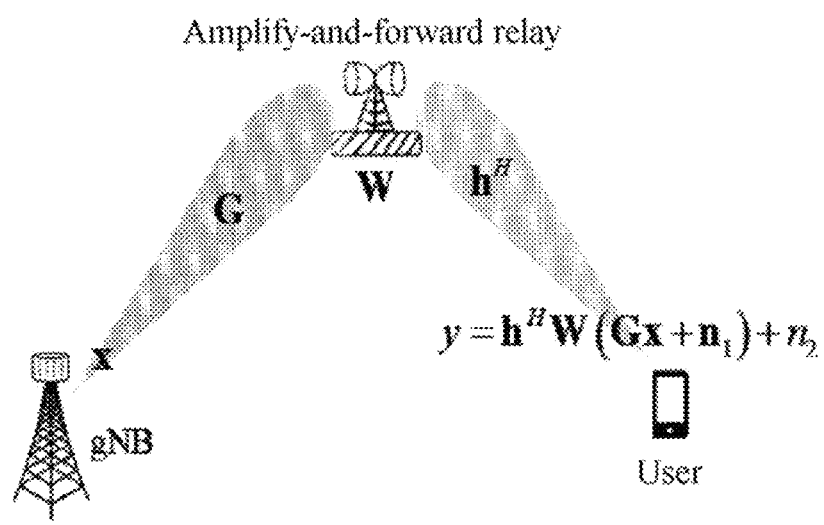

FIG. 5(a) is a schematic diagram showing a relationship between a received signal and a transmitting signal after a passive signal reflection device performs signal reflection. As shown in FIG. 5(a), x represents a signal transmitted by the gNB, G represents a channel matrix of channels between the gNB and the LIS, $h^H$ represents a channel matrix of channels between the LIS and the user, $\Theta$ represents a matrix for phase adjustment by the LIS, and n represents noise on a channel between the gNB and the LIS and noise on a channel between the LIS and the user. Therefore, the signal y received by the user may be expressed as: $y=h^H\Theta Gx+n$. As mentioned above, the LIS cannot estimate the channel matrices G and $h^H$, and the LIS may estimate the equivalent channel of the gNB-LIS-user link, that is, $h^H\Theta G$. However, the complexity of estimating the equivalent channel is high and the overhead is large.

FIG. 5(b) is a schematic diagram showing a relationship between a received signal and a transmitting signal after an amplify-and-forward relay performs signal forwarding. As shown in FIG. 5(b), x represents a signal transmitted by the gNB, G represents a channel matrix of channels between the gNB and the amplify-and-forward relay, $h^H$ represents a channel matrix of channels between the amplify-and-for-ward relay and the user, W represents a matrix for signal processing by the amplify-and-forward relay, $n_1$ represents noise on a channel between the gNB and the amplify-and-forward relay, and $n_2$ represents noise on a channel between the amplify-and-forward relay and the user. Therefore, the signal y received by the user may be expressed as: $y=h^H W(Gx+n_1)+n_2$. It is required for the amplify-and-forward relay to perform signal processing on the received signal, and the amplify-and-forward relay may estimate the channel matrix G and the channel matrix $h^H$.

Figure 6:
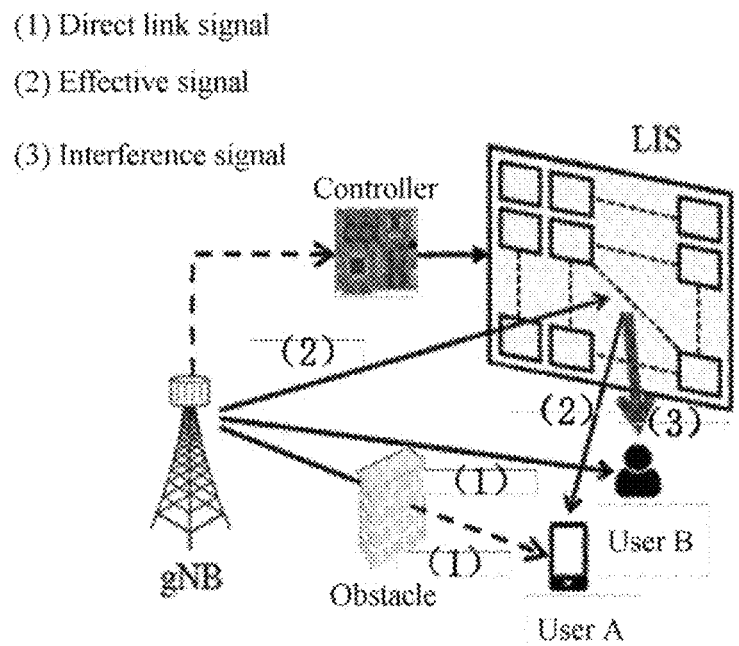
FIG. 6 is a schematic diagram showing a scenario in which a user is interfered in a case of using a passive signal reflection device according to an embodiment of the present disclosure.

FIG. 6 is a schematic diagram showing a scenario in which a user is interfered in a case of using a passive signal reflection device according to an embodiment of the present disclosure. As shown in FIG. 6, arrows labeled by (1) respectively represent a direct link between the gNB and a user A and a direct link between the gNB and a user B, where the direct link between the gNB and the user A is blocked by an obstacle. As indicated by arrows labeled by (2), the gNB controls a reflection direction of an LIS to control the LIS to reflect a signal to the user A, so that the gNB transmits the signal to the user A. The signal is called as an effective signal of the user A. Due to that the user B is close to the user A and the LIS, as indicated by an arrow labeled by (3), the user B may receive a signal reflected by the LIS. The signal is an interference signal for the user B. That is, as shown in FIG. 6, in the downlink transmission by using the LIS, the user equipment B receives the signal reflected by the LIS to the user equipment A, thereby causing interference to the user equipment B.

Figure 7:
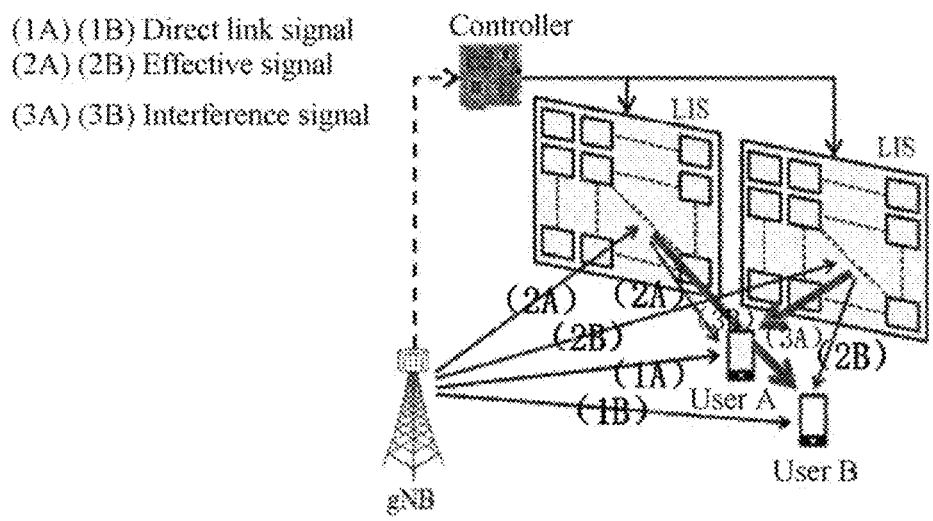
FIG. 7 is a schematic diagram showing a scenario in which a user is interfered in a case of using a passive signal reflection device according to another embodiment of the present disclosure.

FIG. 7 is a schematic diagram showing a scenario in which a user is interfered in the case of using a passive signal reflection device according to another embodiment of the present disclosure. As shown in FIG. 7, an arrow labeled by (1A) represents a direct link between the gNB and a user A, and an arrow labeled by (1B) represents a direct link between the gNB and a user B. As indicated by arrows labeled by (2A), the gNB controls a reflection direction of an LIS on the left to control the LIS on the left to reflect a signal to the user A, so that the gNB transmits the signal to the user A. The signal is called as an effective signal of the user equipment A. Since the user B is close to the user A and the LIS on the left, as indicated by an arrow labeled by (3B), the signal reflected by the LIS on the left may be received by the user B. The signal received by the user B is an interference signal for the user B. Similarly, as indicated by arrows labeled by (2B), the gNB controls a reflection direction of an LIS on the right to control the LIS on the right to reflect a signal to the user B, so that the gNB transmits the signal to the user B. The signal is called as an effective signal of the user equipment B. Since the user A is close to the user B and the LIS on the right, as indicated by an arrow labeled by (3A), the signal reflected by the LIS on the right may be received by the user A. The signal received by the user A is an interference signal for the user A. That is, as shown in FIG. 7, in the downlink transmission by using the LIS, the user equipment B receives the signal reflected by the LIS to the user equipment A, thereby causing interference to the user equipment B; and the user equipment A receives the signal reflected by the LIS to the user equipment B, thereby causing interference to the user equipment A.

According to the embodiments of the present disclosure, the reflection direction of the passive signal reflection device may be controlled by the gNB, thus the gNB may reduce interference to other users by reasonably selecting the passive signal reflection device and controlling the reflection direction of the passive signal reflection device.

In view of such scenarios, an electronic device in a wireless communication system, a wireless communication method performed by an electronic device in a wireless communication system, and a computer-readable storage medium are provided according to the present disclosure, to reasonably determine a reflection direction of a passive signal reflection device, thereby reducing interference of a user equipment to other user equipment in a cell while enhancing the communication quality of the user equipment.

The interference according to the present disclosure mainly refers to interference to other users caused by a downlink signal from a gNB reflected by a passive signal reflection device.

The wireless communication system according to the present disclosure may be a 5G NR (New Radio) communication system.

The network side device according to the present disclosure may be any type of base station equipment, for example, may be an eNB or a gNB (a base station in a 5th generation communication system).

The passive signal reflection device according to the present disclosure may integrate multiple reflection elements, and may be wiredly connected with an intelligent controller. The intelligent controller controls phases of the reflection elements of the passive signal reflection device to adjust a phase of an incident signal. In an embodiment, the base station equipment may be wirelessly connected with the intelligent controller, and control the intelligent controller to control reflection directions of the passive signal reflection devices located within the coverage of the base station. The passive signal reflection devices may be deployed anywhere according to requirements, such as on a surface of a building, thereby improving wireless communication quality.

The passive signal reflection device according to the present disclosure may be a passive signal reflection surface. The surface may be a flat surface or a curved surface. Further, the main material of the reflecting surface may be electromagnetic material, that is, the passive signal reflection device may be a passive electromagnetic signal reflection device. In addition, the passive signal reflection device can only reflect passively, so the passive signal reflection device is called as a passive signal reflection surface. For example, the passive signal reflection device according to the present disclosure may be at least one of the following: LIS (Large Intelligent Surface), IRS (Intelligent Reflecting Surface), RIS (Reconfiguration Intelligent Surface), PIM (Passive Intelligent Mirror). The name of the passive signal reflection device is not limited in the present disclosure, as long as the passive signal reflection device can perform signal reflection passively.

2. CONFIGURATION EXAMPLES OF A NETWORK SIDE DEVICE

Figure 8:
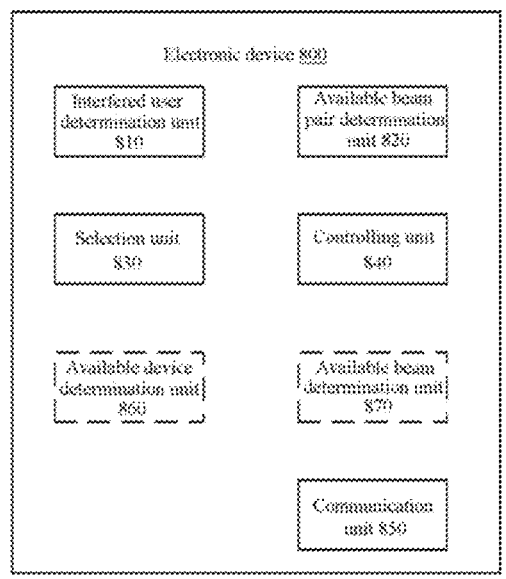
FIG. 8 is a block diagram showing a configuration example of an electronic device according to an embodiment of the present disclosure.

FIG. 8 is a block diagram showing a configuration example of an electronic device 800 according to an embodiment of the present disclosure. The electronic device 800 here be used as a network side device in a wireless communication system, and specifically may be used as base station device in the wireless communication system.

As shown in FIG. 8, the electronic device 800 may include an interfered user determination unit 810, an available beam pair determination unit 820, a selection unit 830, a controlling unit 840 and a communication unit 850.

All the units of the electronic device 800 may be included in a processing circuitry. It should be noted that the electronic device 800 may include one processing circuitry or multiple processing circuitry. Further, the processing circuitry may include various discrete functional units to perform various functions and/or operations. It should be noted that the functional units may be physical entities or logical entities, and units with different titles may be implemented by the same physical entity.

According to an embodiment of the present disclosure, the interfered user determination unit 810 may be configured to determine an interfered user based on multiple available passive signal reflection devices of a user equipment. The interfered user is interfered by at least one of the available passive signal reflection devices.

According to an embodiment of the present disclosure, the user equipment may be any user equipment within the coverage of the electronic device 800, and the user equipment is a user equipment to which a signal is to be reflected by using a passive signal reflection device. The interfered user is another user equipment that may be interfered in reflecting a signal to the user equipment by using the available passive signal reflection device. That is, the interfered user may receive a signal reflected by the available passive signal reflection device of the user equipment, and the signal is an interference signal for the interfered user. There may be one or more interfered users. The interfered user determination unit 810 may determine one or more interfered users for any user equipment within the coverage of the electronic device 800.

According to an embodiment of the present disclosure, the available beam pair determination unit 820 may be configured to determine a set of available beam pairs based on the multiple available passive signal reflection devices of the user equipment. Two beams included in each of the available beam pairs are available beams of two available passive signal reflection devices, respectively.

According to an embodiment of the present disclosure, the available beam pair determination unit 820 may determine a set of available beam pairs for any user equipment within the coverage of the electronic device 800. The set includes multiple available beam pairs, each of the available beam pairs includes two available beams, and the two available beams respectively correspond to two different available passive signal reflection devices. Available beams of an available passive signal reflection device indicate a reflection direction of the available passive signal reflection device.

According to an embodiment of the present disclosure, the selection unit 830 may be configured to select an available beam pair from the set of the available beam pairs based on received signal quality of the user equipment and received signal quality of one or more interfered users determined by the interfered user determination unit 810.

According to an embodiment of the present disclosure, the controlling unit 840 may be configured to adjust reflection directions of two available passive signal reflection devices, corresponding to two beams in the selected available beam pair, to the two beams. For example, the controlling unit 840 may wirelessly control a controller connected to the available passive signal reflection device to control the reflection direction of the available passive signal reflection device.

According to an embodiment of the present disclosure, the electronic device 800 may transmit signals to the two available passive signal reflection devices, corresponding to the two beams in the selected available beam pair, through the communication unit 850, so that the two available passive signal reflection devices may respectively reflect signals from the electronic device 800 to the user equipment by using the two beams in the selected available beam pair.

As described above, with the electronic device 800 according to the present disclosure, one beam pair can be selected from multiple available beam pairs based on the received signal quality of the user equipment and the received signal quality of the interfered user, so that the passive signal reflection devices can reflect signals to the user equipment by using the selected beam pair. In this way, the received signal quality of the user equipment can be enhanced, and the interference to interfered users can be reduced.

As shown in FIG. 8, according to an embodiment of the present disclosure, the electronic device 800 may further include an available device determination unit 860. The available device determination unit 860 is configured to determine the multiple available passive signal reflection devices of the user equipment. That is, there may be multiple passive signal reflection devices within the coverage of the electronic device 800, and the available device determination unit 860 may determine the multiple available passive signal reflection devices for the user equipment.

According to an embodiment of the present disclosure, the available device determination unit 860 may determine the multiple available passive signal reflection devices of the user equipment based on a range of received signals of the user equipment and a range of transmitting signals of the electronic device 800. The range of the received signals of the user equipment refers to a geographical region in which the received signal quality of the user equipment is greater than a predetermined threshold, and the range of the transmitting signals of the electronic device 800 refers to a geographical region in which the transmitting signal quality of the electronic device 800 is greater than a predetermined threshold. In an embodiment, the range of the received signals of the user equipment may be represented by a circle with the user equipment as a center and with an effective receiving distance of the user equipment as a radius, and the range of the transmitting signals of the electronic device 800 may be represented by a circle with the electronic device 800 as a center and with an effective transmission distance of the electronic device 800 as a radius.

According to an embodiment of the present disclosure, the available device determination unit 860 may be configured to determine multiple passive signal reflection devices, in an overlapped region of the range of the received signals of the user equipment and the range of the transmitting signals of the electronic device 800, as the multiple available passive signal reflection devices of the user equipment. The passive signal reflection devices in the overlapped region may well receive signals from the electronic device 800, and the user equipment may well receive signals from the passive signal reflection devices in the overlapped region, so that the passive signal reflection devices in the overlapped region may be determined as the available passive signal reflection devices of the user equipment.

Figure 9:
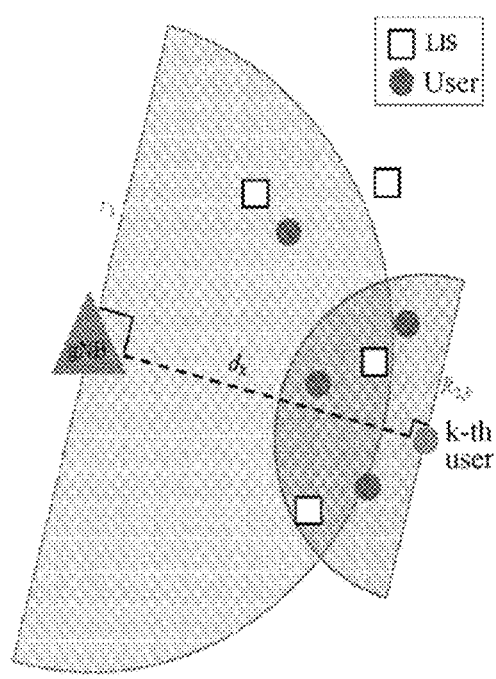
FIG. 9 is a schematic diagram showing a process of determining an available passive signal reflection device according to an embodiment of the present disclosure.

FIG. 9 is a schematic diagram showing a process of determining an available passive signal reflection device according to an embodiment of the present disclosure. In FIG. 9, the electronic device 800 is implemented by a gNB, a k-th user represents a user equipment to which a passive signal reflection device is to reflect a signal, a square represents an LIS, and a circle represents a user equipment. A circle with the gNB as a center and with $r_1$ as a radius may represent a range of the transmitting signals of the gNB, where $r_1$ is an effective transmission distance of the gNB. A circle with the k-th user as a center and with $R_{2,k}$ as a radius represents a range of received signals of the k-th user, where $R_{2,k}$ represents an effective reception distance of the k-th user. $d_k$ represents a distance between the gNB and the k-th user. As shown in FIG. 9, there are two LISs in the overlapped region of the range of the transmitting signals of the gNB and the range of the received signals of the k-th user, so that the available device determination unit 860 may determine the two LISs as the available passive signal reflection devices of the k-th user.

According to an embodiment of the present disclosure, the interfered user determination unit 810 may be configured to determine, for each of the available passive signal reflection devices, an interference range of the available passive signal reflection device based on a range of reflected signals of the available passive signal reflection device and a position of the user equipment.

According to an embodiment of the present disclosure, the range of the reflected signals of the passive signal reflection device may be represented by a reflection distance of the passive signal reflection device. The reflection distance is a farthest distance that the reflected signal can reach within ranges of all the reflected beams of the passive signal reflection device. In an embodiment, the range of the reflected signals of the passive signal reflection device may be a sector (specifically a semicircle) with the passive signal reflection device as a center, with the reflection distance of the passive signal reflection device as a radius and determined based on directions of all the beams of the passive signal reflection device.

The interfered user determination unit 810 may determine the interference range of the available passive signal reflection device based on the reflection distance of the available passive signal reflection device and/or the distance between the available passive signal reflection device and the user equipment. In addition, the interference range of the available passive signal reflection device may be in a rectangle-shape, a semicircle-shape or a hexagon-shape, which is not limited in the present disclosure.

According to an embodiment of the present disclosure, the following semicircular region may be used as the interference range of the available passive signal reflection device. The semicircular region takes the available passive signal reflection device as a center, a line connecting the available passive signal reflection device and the user equipment as a symmetry axis, and the reflection distance of the available passive signal reflection device as a radius.

According to another embodiment of the present disclosure, the following rectangular region may be used as the interference range of the available passive signal reflection device. The rectangular region takes a line connecting the available passive signal reflection device and the user equipment as a symmetry axis, a distance between the passive signal reflection device and the user equipment as a length of a side parallel to the symmetry axis, and a length of twice the reflection distance of the available passive signal reflection device as a length of a side perpendicular to the symmetry axis.

According to an embodiment of the present disclosure, the interfered user determination unit 810 may be configured to determine, for each of the available passive signal reflection devices of the user equipment, the interference range of the available passive signal reflection device, and then determine the interfered user of the user equipment based on the interference range of each of the available passive signal reflection devices. Specifically, the interfered user determination unit 810 may determine a user within an interference range of one or more available passive signal reflection devices as the interfered user. That is, the interfered user determination unit 810 determines a union of users within the interference ranges of all the available passive signal reflection devices as the interfered users of the user equipment.

Figure 10:
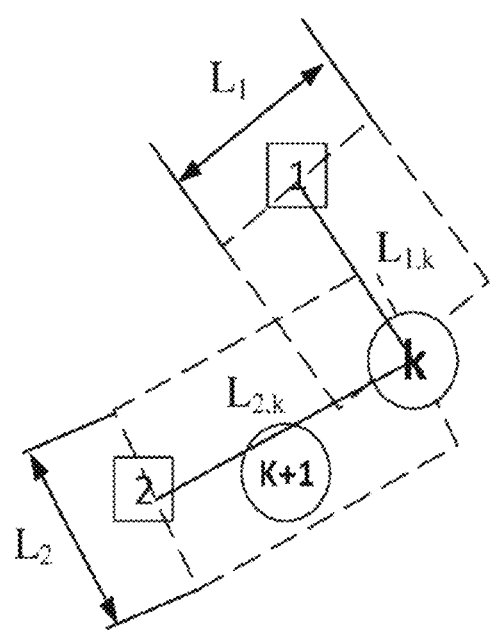
FIG. 10 is a schematic diagram showing a process of determining an interfered user according to an embodiment of the present disclosure.

FIG. 10 is a schematic diagram showing a process of determining an interfered user according to an embodiment of the present disclosure. In FIG. 10, a circular labeled by k represents a k-th user, and two squares labeled by 1 and 2 represent two available LISs of the k-th user determined by the available device determination unit 860. As shown in FIG. 10, $L_{2,k}$ represents a distance between the LIS labeled by 2 and the k-th user, and $L_2$ represents a length twice a reflection distance of the LIS labeled by 2. A rectangular region with a line connecting the LIS labeled by 2 and the k-th user as a symmetry axis, with $L_{2,k}$ as a length of a side parallel to the symmetry axis and with $L_2$ as a length of a side perpendicular to the symmetry axis, represents an interference range (shown as a dashed rectangular region) of the LIS labeled by 2. Similarly, $L_{1,k}$ represents a distance between the LIS labeled by 1 and the k-th user, and $L_1$ represents a length twice a reflection distance of the LIS labeled by 1. A rectangular region, with a line connecting the LIS labeled by 1 and the k-th user as a symmetry axis, with $L_{1,k}$ as a length of a side parallel to the symmetry axis and with $L_1$ as a length of a side perpendicular to the symmetry axis, represents the interference range (shown as a dashed rectangular region) of the LIS labeled by 1. As shown in FIG. 10, there is a user in the interference range of the LIS labeled by 2, that is, a (k+1)th user in a circle labeled by k+1, and there is no user in the interference range of the LIS labeled by 1. Therefore, in the embodiment shown in FIG. 10, the interfered user determination unit 810 may determine that the interfered user of the k-th user is the (k+1)th user. As described above, FIG. 10 shows the process of determining an interfered user by the interfered user determination unit 810 by taking a rectangular interference range region as an example. For a semicircular interference range region or an interference range region in other shapes, the process of determining an interfered user is similar to the above process, which is not repeated in the present disclosure.

As shown in FIG. 8, according to an embodiment of the present disclosure, the electronic device 800 may further include an available beam determination unit 870. The available beam determination unit 870 is configured to determine available beams of each of the available passive signal reflection devices.

According to an embodiment of the present disclosure, the available beam determination unit 870 may determine, for each of the available passive signal reflection devices, beams of the available passive signal reflection device which have an overlapped region with a range of reflected signals of another available passive signal reflection device as available beams of the available passive signal reflection device.

Figure 11:
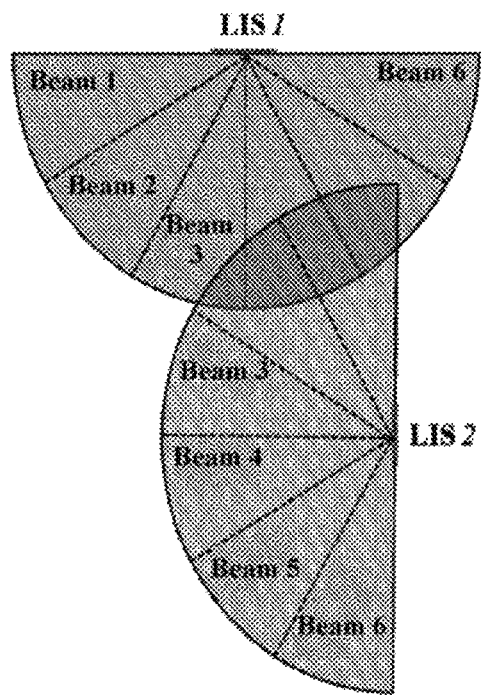
FIG. 11 is a schematic diagram showing a process of determining available beams of a passive signal reflection device according to an embodiment of the present disclosure.

FIG. 11 is a schematic diagram showing a process of determining available beams of a passive signal reflection device according to an embodiment of the present disclosure. FIG. 11 shows two available passive signal reflection devices LIS1 and LIS2 of the user equipment, and a range of reflected signals of each of the LISs is semicircular. For example, the range of the reflected signals of the LIS1 is a semicircular region with the LIS1 as a center, with a reflection distance of the LIS1 as a radius, and intercepted in a direction of an array surface of the LIS1. The beams of the LIS1 include beam 1, beam 2, beam 3, . . . , and beam 6. The range of the reflected signals of the LIS2 is a semicircular region with the LIS2 as a center, with a reflection distance of the LIS2 as a radius, and intercepted in a direction of an array surface of the LIS2. The beams of the LIS2 include beam 1, beam 2, beam 3, . . . , and beam 6. According to an embodiment of the present disclosure, there is an overlapped region of the beam 3, beam 4 and beam 5 of the LIS1 and the range of the reflected signals of the LIS2, so that the available beam determination unit 870 may determine the beam 3, beam 4 and beam 5 of the LIS1 as available beams of the LIS1. Similarly, there is an overlapped region of the beam 1 and beam 2 of the LIS2 and the range of the reflected signals of the LIS1, so that the available beam determination unit 870 may determine the beam 1 and beam 2 of the LIS2 as available beams of the LIS2.

Figure 12:
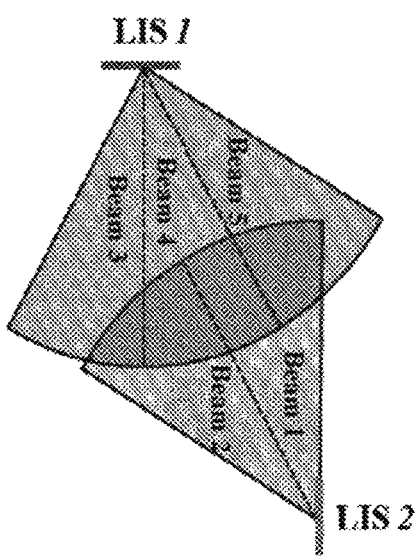
FIG. 12 is a schematic diagram showing determined available beams of two passive signal reflection devices according to an embodiment of the present disclosure.

FIG. 12 is a schematic diagram showing determined available beams of two passive signal reflection devices according to an embodiment of the present disclosure. As shown in FIG. 12, the available beams of the LIS1 include beam 3, beam 4 and beam 5, and the available beams of the LIS2 include beam 1 and beam 2.

It should be noted that FIGS. 11 and 12 show a situation in which the available passive signal reflection devices of the user equipment include two passive signal reflection devices. For a case in which the available passive signal reflection devices include more than three passive signal reflection devices, it is only required for a beam of one passive signal reflection device to overlap with a range of reflected signals of any one or more other passive signal reflection devices, and it is unnecessary for a beam of one passive signal reflection device to overlap with ranges of reflected signals of all the passive signal reflection devices.

According to an embodiment of the present disclosure, since the LIS1 and LIS2 are passive signal reflection devices determined based on the range of the received signals of the user equipment, it is very likely that the user equipment is located in an overlapped region of the range of the reflected signals of the LIS1 and the range of the reflected signals of the LIS2. Therefore, the available beams of the available passive signal reflection devices determined by the available beam determination unit 870 by using the above method may better fit the direction of the user equipment, so that the electronic device 800 may determine the beams to be used based on the available beams of each of the available passive signal reflection devices, thereby greatly improving the communication quality of the user equipment.

According to an embodiment of the present disclosure, after the available beam determination unit 870 determines the available beams of each of the available passive signal reflection devices, the available beam pair determination unit 820 may determine the set of the available beam pairs based on the available beams of each of the available passive signal reflection devices.

According to an embodiment of the present disclosure, the available beam pair determination unit 820 may exhaustively enumerate or traverse all possible available beam pair, and two available beams in each of the available beam pairs are available beams of different available passive signal reflection devices. For example, in a case that the available passive signal reflection devices of the user equipment includes two passive signal reflection devices, assuming that the two passive signal reflection devices respectively include M and N available beams, the available beam pair determination unit 820 may determine M*N available beam pairs.

For example, in the embodiment shown in FIG. 12, the available beams of the LIS1 include beam 3, beam 4 and beam 5, and the available beams of the LIS2 include beam 1 and beam 2, then the available beam pair determination unit 820 may determine a set of available beam pairs including the following six available beam pairs (C1-C6):

C1=beam 3 of LIS1, beam 1 of LIS2;
C2=beam 3 of LIS1, beam 2 of LIS2;
C3=beam 4 of LIS1, beam 1 of LIS2;
C4=beam 4 of LIS1, beam 2 of LIS2;
C5=beam 5 of LIS1, beam 1 of LIS2; and
C6=beam 5 of LIS1, beam 2 of LIS2.

As described above, the set of the available beam pairs is illustrated by taking the available passive signal reflection devices of the user equipment including two passive signal reflection devices as an example. In a case that the available passive signal reflection devices of the user equipment include more than three passive signal reflection devices, the available beam pairs in the set of the available beam pairs still include only two available beams, that is, two available beams of two different available passive signal reflection devices are sufficient. Therefore, the passive signal reflection devices to serve the user equipment only includes two passive signal reflection devices, and other passive signal reflection devices may serve other user equipment, thereby not occupying too many resources while improving the receiving quality of the user equipment.

As described above, the interfered user determination unit 810 may determine one or more interfered users of the user equipment, and the available beam pair determination unit 820 may determine the set of the available beam pairs. The selection unit 830 and the controlling unit 840 are described in detail below.

According to an embodiment of the present disclosure, for each of the available beam pairs in the set of the available beam pairs determined by the available beam pair determination unit 820, the controlling unit 840 may respectively adjust reflection directions of two available passive signal reflection devices corresponding to two beams in the available beam pair to the two beams. For example, for the available beam pair including the beam 3 of the LIS1 and the beam 1 of the LIS2, the controlling unit 840 may adjust the reflection direction of the LIS1 to the beam 3 and adjust the reflection direction of the LIS2 to the beam 1. Further, the electronic device 800 may respectively transmit a downlink signal to the two available passive signal reflection devices, so that the two available passive signal reflection devices respectively reflect a downlink signal to the user equipment. The electronic device 800 may transmit the downlink signals to the available passive signal reflection devices by beamforming, or may transmit the downlink signals to the available passive signal reflection devices by omnidirectional signal.

Figure 13:
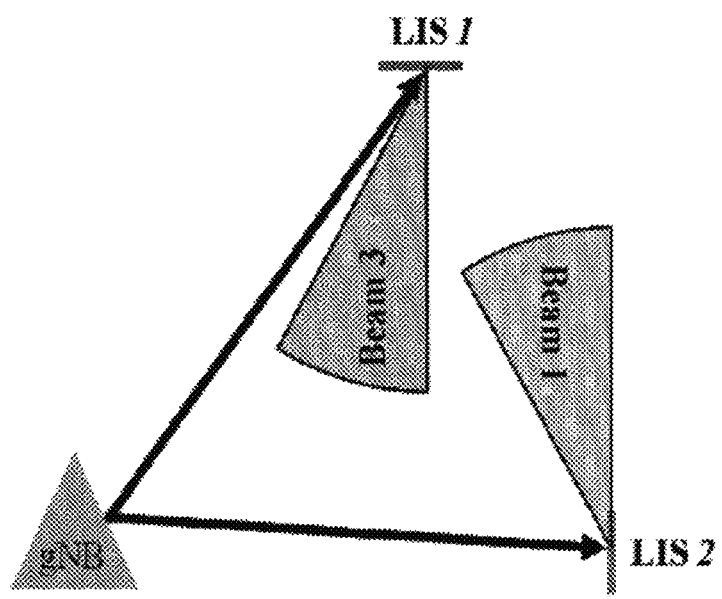
FIG. 13 is a schematic diagram showing a process of selecting an available beam pair according to an embodiment of the present disclosure.

FIG. 13 is a schematic diagram showing a process of selecting an available beam pair according to an embodiment of the present disclosure. As shown in FIG. 13, the gNB respectively transmits a downlink signal to the LIS1 and the LIS2. The LIS1 may reflect the downlink signal to the user equipment by using beam 3, and the LIS2 may reflect the downlink signal to the user equipment by using beam 1.

According to an embodiment of the present disclosure, the electronic device 800 may receive the received signal quality of the user equipment from the user equipment through the communication unit 850. Since the user equipment may receive the reflected signals from the two available passive signal reflection devices, the user equipment may combine the two reflected signals to determine the received signal quality. The user equipment may combine the two signals by using any method known in the art, which is not limited in the present disclosure. In addition, the received signal quality may be represented by various parameters, such as received signal strength.

According to an embodiment of the present disclosure, the electronic device 800 may receive the received signal quality of the interfered user from each of the one or more interfered users determined by the interfered user determination unit 810 through the communication unit 850. Similarly, the received signal quality may be represented by various parameters, such as received signal strength.

According to an embodiment of the present disclosure, the selection unit 830 may select the available beam pair based on the received signal quality of the user equipment and the received signal quality of each of the interfered users. For example, the selection unit 830 may calculate a ratio of the received signal quality of the user equipment to a sum of the received signal quality of all the interfered users. Optionally, the selection unit 830 may calculate a ratio of the received signal quality of the user equipment to a sum of the received signal quality of all the interfered users and noise powers.

As described above, for any available beam pair in the set of the available beam pairs, the controlling unit 840 may adjust the reflection directions of the two available passive signal reflection devices corresponding to the two beams in the available beam pair to be respectively consistent with the directions of the two beams. The user equipment and each of the interfered users respectively measure the received signal quality. The selection unit 830 may calculate the ratio of the received signal quality of the user equipment to the sum of the received signal quality of all the interfered users based on the received signal quality of the user equipment and the received signal quality of each of the interfered users. That is, the selection unit 830 may calculate a ratio for any available beam pair in the set of the available beam pairs.

According to an embodiment of the present disclosure, the selection unit 830 may select, from the set of the available beam pairs, an available beam pair having a maximum ratio. Thus, for the selected available beam pair, the received signal quality of the user equipment is good and the received signal quality of the interfered user is poor, that is, the interference to the interfered users is small. Therefore, the electronic device 800 selects a beam pair in this way according to the embodiment of the present disclosure, improving the channel quality of the user equipment while reducing interference to other users.

According to an embodiment of the present disclosure, the selection unit 830 may select a beam pair for a k-th user by using the following equation:

$$i_{opt} = \arg\max_{\substack{i=1,2,\ldots \\ k' \neq k}} \frac{P_{k,i}}{\sum_{k' \neq k} P_{k',i} + P_N}$$

In the above equation, i represents the number of the available beam pair in the set of the available beam pairs, $P_{k,i}$ represents received signal quality of the k-th user for the i-th available beam pair, $P_{k',i}$ represents received signal quality of an interfered user k' for the i-th available beam pair, $\sum_{k' \neq k} P_{k',i}$ represents a sum of received signal quality of all the interfered users for the i-th available beam pair, $P_N$ represents a noise power, $i_{opt}$ represents the number of an available beam pair selected by the selection unit 830 with which a maximum ratio $$\frac{p_{k,i}}{\sum_{k'\neq k} p_{k',i} + P_N}$$

is achieved.

According to an embodiment of the present disclosure, after the selection unit 830 selects the available beam pair, the controlling unit 840 may adjust the reflection directions of the two available passive signal reflection devices corresponding to the two beams in the selected available beam pair to be respectively consistent with directions of the two beams. Then, the electronic device 800 may respectively transmit a signal to the two available passive signal reflection devices corresponding to the two beams in the selected available beam pair through the communication unit 850, so that the two available passive signal reflection devices reflect signals from the electronic device 800 to the user equipment by using the two beams respectively.

According to an embodiment of the present disclosure, the electronic device 800 may determine to enable a passive signal reflection device mode for the user equipment, that is, a signal from the electronic device 800 is reflected by the passive signal reflection device. For example, the electronic device 800 may determine the received signal quality of the user equipment based on feedback from the user equipment, and then determines to enable the passive signal reflection device mode in a case that the received quality of the user equipment is less than a predetermined threshold.

According to an embodiment of the present disclosure, the passive signal reflection device mode may be enabled in response to a request from the user equipment. For example, the electronic device 800 may receive request information from the user equipment indicating enabling the passive signal reflection device mode through the communication unit 850, and then enables the passive signal reflection device mode for the user equipment in response to the request information.

According to an embodiment of the present disclosure, the electronic device 800 may collect configuration information, including a position, a size of a reflection surface and ranges of angles of all reflection beams of the reflection surface, of each of the passive signal reflection devices within the coverage of the electronic device 800. The above process may be performed by reporting the above information to the electronic device 800 in deploying or adjusting the passive signal reflection devices. Further, the electronic device 800 may transmit information, about whether there is a passive signal reflection device within the coverage of the electronic device 800, to the user equipment.

According to an embodiment of the present disclosure, in a case that there is a passive signal reflection device in the coverage of the electronic device 800, the user equipment may determine whether to enable the passive signal reflection device mode based on the received signal quality. Specifically, in a case that the received signal quality of the user equipment is less than a predetermined threshold, the user equipment may determine to enable the passive signal reflection device mode. For example, the k-th user may determine to enable the passive signal reflection device mode in a case that the following inequality holds:

$$\log_2(1+p_k\sigma^{-2}) < R_{min,k}$$

where $p_k$ represents a received signal power of the k-th user, $\sigma^2$ represents a sum of an interference signal power and a noise power, and $R_{min,k}$ represents a predetermined threshold of the received signal quality of the k-th user.

As described above, according to the embodiments of the present disclosure, the passive signal reflection device mode may be enabled by the electronic device 800 or the user equipment. In a case that the passive signal reflection device mode is enabled, the electronic device 800 may determine multiple available passive signal reflection devices and one or more interfered users of the user equipment, and may determine available beams of the available passive signal reflection devices and then determine the set of the available beam pairs. Further, the electronic device 800 may select an available beam pair from the set of the available beam pairs based on the received signal quality of the user equipment and the received signal quality of each of the interfered users, so that the two passive signal reflection devices, corresponding to the two available beams included in the selected available beam pair, reflect signals to the user equipment by using the two available beams. Therefore, the electronic device 800 may reasonably select passive signal reflection devices and available beams, thereby reducing interference to other users while improving the received signal quality of the user equipment.

Figure 14:
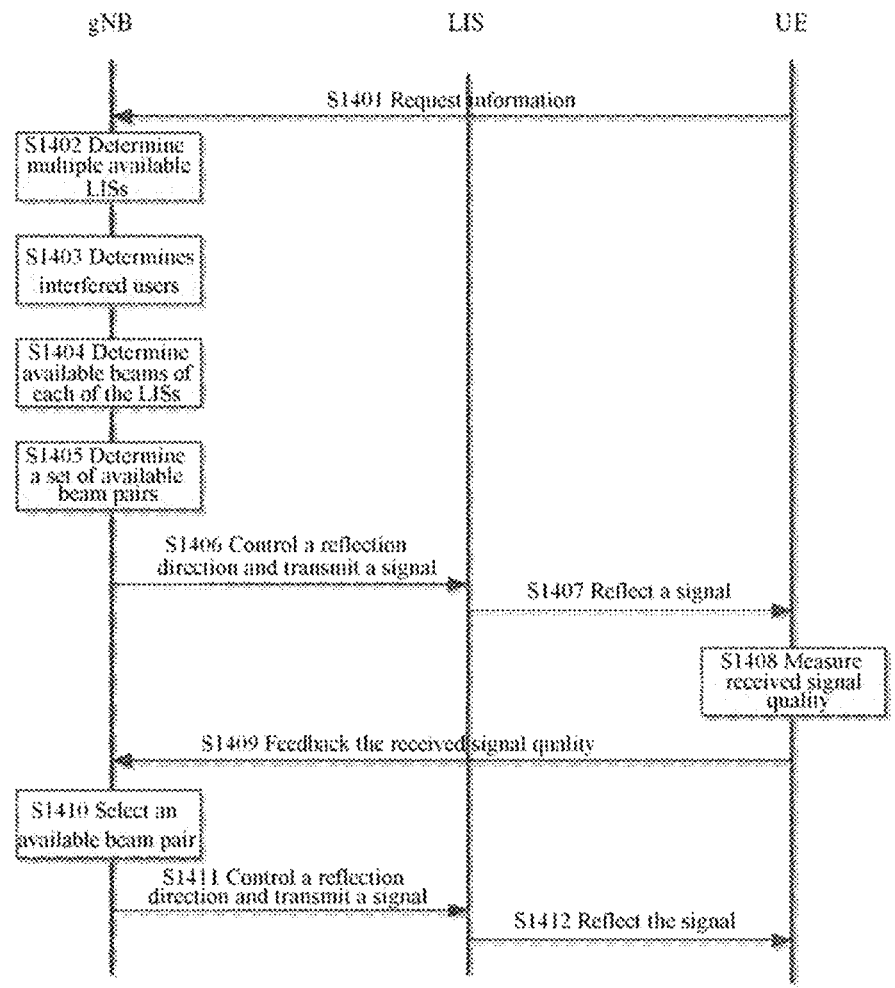
FIG. 14 is a signaling flowchart showing a process of selecting an available beam pair and controlling a passive signal reflection device to reflect a signal with the selected available beam pair according to an embodiment of the present disclosure.

FIG. 14 is a signaling flowchart showing a process of selecting an available beam pair and controlling a passive signal reflection device to reflect a signal with the selected available beam pair according to an embodiment of the present disclosure. In FIG. 14, the gNB may be implemented by the electronic device 800, and the passive signal reflection device is illustrated by taking the LIS as an example. In step S1401, a UE transmits request information to a gNB to request to enable a passive signal reflection device mode. In step S1402, the gNB determines multiple available LISs for the UE. In step S1403, the gNB determines one or more interfered users of the UE. In step S1404, the gNB determines available beams of each of the available LISs. In step S1405, the gNB determines a set of available beam pairs based on the available beams of each of the LISs. In step S1406, for each of available beam pairs in the set of the available beam pairs, the gNB controls reflection directions of LISs corresponding to two available beams included in the available beam pair, and transmits a signal to the two LISs respectively. In step S1407, each of the LISs reflects a signal to the UE under the control of the gNB. In step S1408, the UE measures received signal quality, and the interfered users may respectively measure received signal quality. In step S1409, the UE feeds back the measured received signal quality to the gNB, and the interfered users may feedback the measured received signal quality to the gNB. In step S1410, the gNB selects an available beam pair from the set of the available beam pairs based on the received signal quality of the UE and the received signal quality of the interfered users. In step S1411, the gNB adjusts reflection directions of two LISs corresponding to two available beams included in the selected available beam pair to be respectively consistent with directions of the two available beams, and transmits a downlink signal to each of the two LISs. In step S1412, the two LISs reflect signals to the UE by using the two available beams included in the selected available beam pair respectively. Therefore, the UE may receive signals reflected by using the selected available beam pair, thereby improving the communication quality.

3. METHOD EMBODIMENTS

Hereinafter, a wireless communication method performed by an electronic device 800 serving as a network side device in a wireless communication system according to an embodiment of the present disclosure is described in detail.

Figure 15:
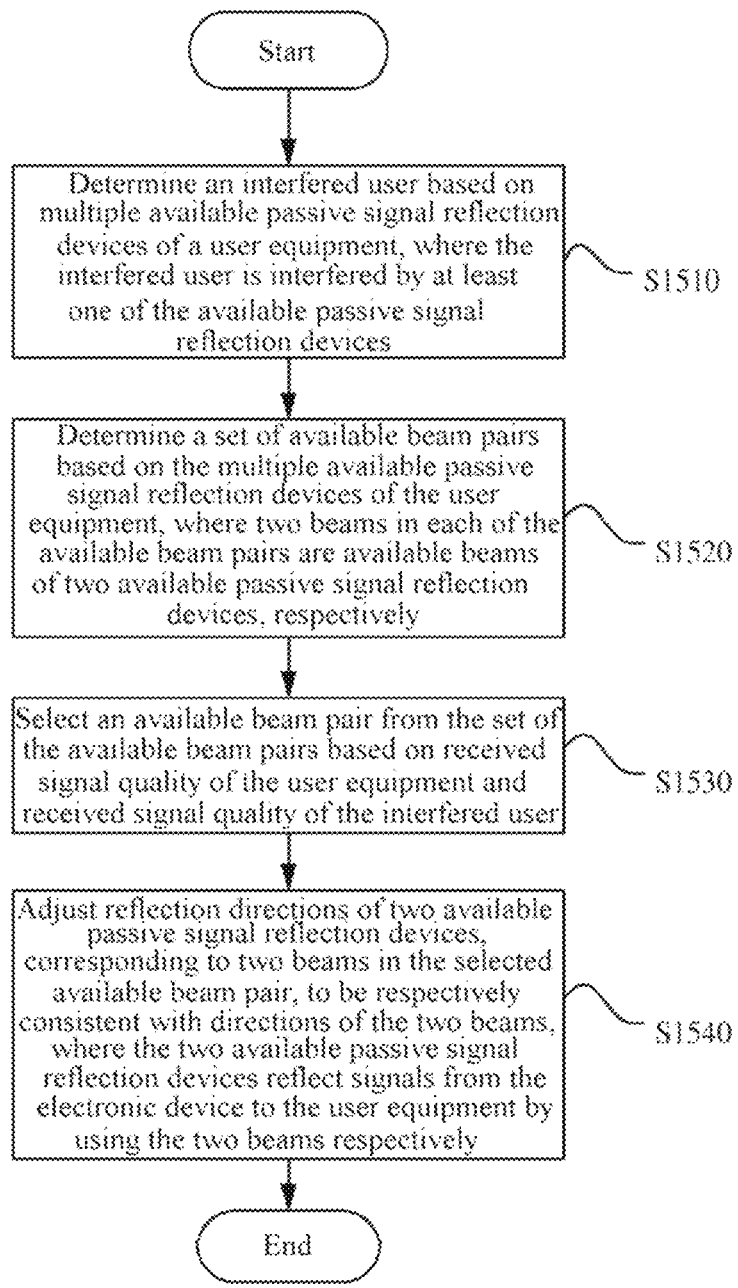
FIG. 15 is a flowchart of a wireless communication method performed by an electronic device according to an embodiment of the present disclosure.

FIG. 15 is a flowchart showing a wireless communication method performed by an electronic device 800 serving as a network side device in a wireless communication system according to an embodiment of the present disclosure.

As shown in FIG. 15, in step S1510, an interfered user is determined based on multiple available passive signal reflection devices of a user equipment. The interfered user is interfered by at least one of the available passive signal reflection devices.

In step S1520, a set of available beam pairs is determined based on the multiple available passive signal reflection devices of the user equipment. Two beams in each of the available beam pairs are available beams of two available passive signal reflection devices.

In step S1530, an available beam pair is selected from the set of the available beam pairs based on received signal quality of the user equipment and received signal quality of the interfered user.

In step S1540, reflection directions of two available passive signal reflection devices corresponding to two beams in the selected available beam pair to be respectively consistent with directions of the two beams, so that the two available passive signals reflection devices reflect signals from the electronic device 800 to the user equipment by using the two beams respectively.

In an embodiment, the wireless communication method further includes: determining the multiple available passive signal reflection devices of the user equipment based on a range of received signals of the user equipment and a range of transmitting signals of the electronic device 800.

In an embodiment, the determining the multiple available passive signal reflection devices of the user equipment includes: determining multiple available passive signal reflection devices, in an overlapped region of the range of received signals of the user equipment and the range of transmitting signals of the electronic device 800, as the multiple available passive signal reflection devices.

In an embodiment, the determining an interfered user includes: determining, for each of the available passive signal reflection devices, an interference range of the available passive signal reflection device based on a range of reflected signals of the available passive signal reflection device and a position of the user equipment; and determining the interfered user based on the interference range of each of the available passive signal reflection devices.

In an embodiment, the determining an interfered user includes: determining a user within an interference range of one or more available passive signal reflection devices as the interfered user.

In an embodiment, the wireless communication method further includes: determining, for each of the available passive signal reflection devices, beams of the available passive signal reflection device which have an overlapped region with a range of reflected signals of another available passive signal reflection device as available beams of the available passive signal reflection device; and determining the set of the available beam pairs based on the available beams of each of the available passive signal reflection devices.

In an embodiment, the wireless communication method further includes performing following operations on each of available beam pairs: respectively adjusting reflection directions of two available passive signal reflection devices corresponding to two beams in the available beam pair to be consistent with directions of the two beams, and respectively transmitting downlink signals to the user equipment through the two available passive signal reflection devices; receiving, from the user equipment, the received signal quality of the user equipment; and receiving, from interfered users, received signal quality of the interfered users.

In an embodiment, the selecting an available beam pair includes: calculating, for each of the available beam pair, a ratio of the received signal quality of the user equipment to a sum of received signal quality of all the interfered users; and selecting, from the set of the available beam pairs, an available beam pair having a maximum ratio.

In an embodiment, the wireless communication method further includes: receiving, from the user equipment, request information indicating enabling a passive signal reflection device mode, where the enabling a passive signal reflection device mode indicates that signals from the electronic device 800 are reflected by the passive signal reflection devices.

In an embodiment, the passive signal reflection devices are passive electromagnetic signal reflection surfaces.

According to an embodiment of the present disclosure, the subject that performs the method may be the electronic device 800 according to the embodiments of the present disclosure, so all the embodiments of the electronic device 800 are applicable herein.

4. APPLICATION EXAMPLES

The technology according to the present disclosure is applicable to various products.

For example, the network side device may be implemented as any type of base stations, such as a macro eNB and a small eNB, and may be implemented as any type of gNB (a base station in a 5G system). The small eNB may be an eNB, such as a pico eNB, a micro eNB, and a home (femto) eNB, which covers a cell smaller than a macro cell. Alternatively, the base station may be implemented as any other type of base station, such as a NodeB and a base transceiver station (BTS). The base station may include a body (which is also referred to as a base station device) configured to control wireless communications; and one or more remote radio heads (RRHs) that are arranged in a different position from the body.

The user equipment may be implemented as a mobile terminal (such as a smart phone, a tablet personal computer (PC), a notebook PC, a portable game terminal, a portable/dongle-type mobile router, and a digital camera device), or an in-vehicle terminal (such as a car navigation device). The user equipment may also be implemented as a terminal (which is also referred to as a machine type communication (MTC) terminal) that performs machine-to-machine (M2M) communication. In addition, the user equipment may be a wireless communication module (such as an integrated circuit module including a single chip) mounted on each of the user equipments.

[Application Examples of a Base Station]

First Application Example

Figure 16:
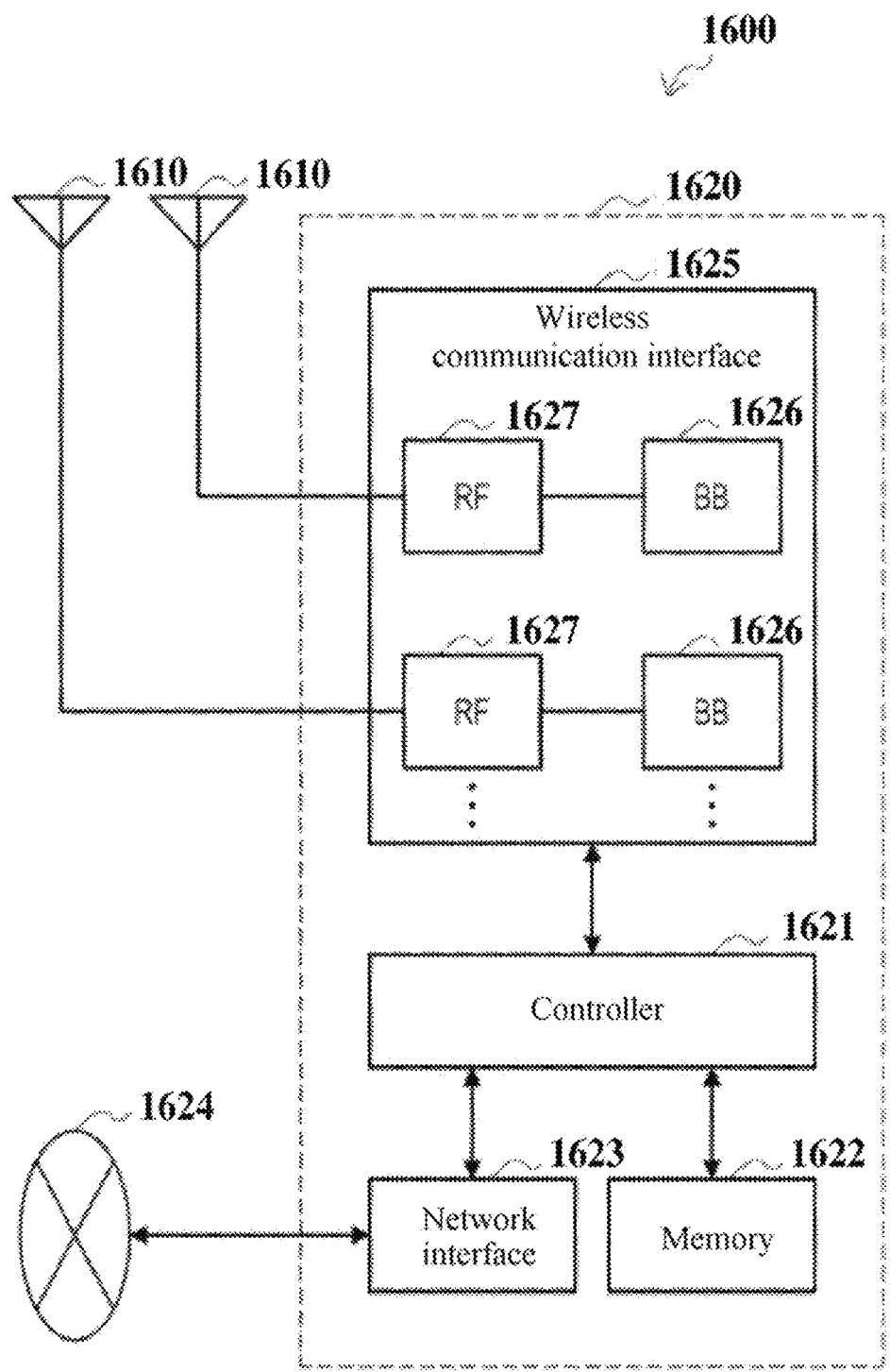
FIG. 16 is a block diagram showing a first example of a schematic configuration of an eNB (Evolved Node B)

FIG. 16 is a block diagram showing a first example of a schematic configuration of a gNB to which the technology of the present disclosure may be applied. A gNB 1600 includes one or more antennas 1610 and a base station device 1620. The base station device 1620 and each of the antennas 1610 may be connected to each other via a RF cable.

Each of the antennas 1610 includes a single or multiple antenna elements (such as multiple antenna elements included in a multiple-input multiple-output (MIMO) antenna), and is used for transmitting and receiving wireless signals by the base station device 1620. As shown in FIG. 16, the gNB 1600 may include multiple antennas 1610. For example, the multiple antennas 1610 may be compatible with multiple frequency bands used by the gNB 1600. Although FIG. 16 shows the example in which the gNB 1600 includes the multiple antennas 1610, the gNB 1600 may also include a single antenna 1610.

The base station device 1620 includes a controller 1621, a memory 1622, a network interface 1623, and a wireless communication interface 1625.

The controller 1621 may be, for example, a CPU or a DSP, and operate various functions of a higher layer of the base station equipment 1620. For example, the controller 1621 generates a data packet based on data in signals processed by the wireless communication interface 1625, and transfers the generated packet via the network interface 1623. The controller 1621 may bundle data from multiple baseband processors to generate a bundled packet, and transfer the generated bundled packet. The controller 1621 may have logical functions of performing control such as radio resource control, radio bearer control, mobility management, admission control, and scheduling. The control may be performed in conjunction with a gNB or a core network node in the vicinity. The memory 1622 includes a RAM and a ROM, and stores a program that is executed by the controller 1621, and various types of control data (such as a terminal list, transmitting power data, and scheduling data).

The network interface 1623 is a communication interface for connecting the base station device 1620 to a core network 1624. The controller 1621 may communicate with a core network node or another gNB via the network interface 1623. In this case, the gNB 1600 and the core network node or the other gNB may be connected to each other via a logical interface (such as an S1 interface and an X2 interface). The network interface 1623 may also be a wired communication interface or a wireless communication interface for radio backhaul. If the network interface 1623 is a wireless communication interface, the network interface 1623 may use a higher frequency band for wireless communication than a frequency band used by the wireless communication interface 1625.

The wireless communication interface 1625 supports any cellular communication scheme (such as Long Term Evolution (LTE) and LTE-Advanced), and provides wireless connection to a terminal positioned in a cell of the gNB 1600 via the antenna 1610. The wireless communication interface 1625 may typically include, for example, a baseband (BB) processor 1626 and an RF circuit 1627. The BB processor 1626 may perform, for example, coding/decoding, modulation/demodulation and multiplexing/de-multiplexing, and performs various types of signal processing of layers (such as L1, media access control (MAC), radio link control (RLC) and a packet data convergence protocol (PDCP)). Instead of the controller 1621, the BB processor 1626 may have a part or all of the above logical functions. The BB processor 1626 may be a memory storing a communication control program, or a module including a processor and a related circuit configured to execute the programs. Updating the program may change the functions of the BB processor 1626. The module may be a card or a blade that is inserted into a slot of the base station device 1620. Alternatively, the module may be a chip that is mounted on the card or the blade. In addition, the RF circuit 1627 may include, for example, a frequency mixer, a filter and an amplifier, and transmits and receives wireless signals via the antenna 1610.

As shown in FIG. 16, the wireless communication interface 1625 may include multiple BB processors 1626. For example, the multiple BB processors 1626 may be compatible with multiple frequency bands used by the gNB 1600. As shown in FIG. 16, the wireless communication interface 1625 may include multiple RF circuits 1627. For example, the multiple RF circuits 1627 may be compatible with multiple antenna elements. Although FIG. 16 shows the example in which the wireless communication interface 1625 includes the multiple BB processors 1626 and the multiple RF circuits 1627, the wireless communication interface 1625 may also include a single BB processor 1626 and a single RF circuit 1627.

Second Application Example

Figure 17:
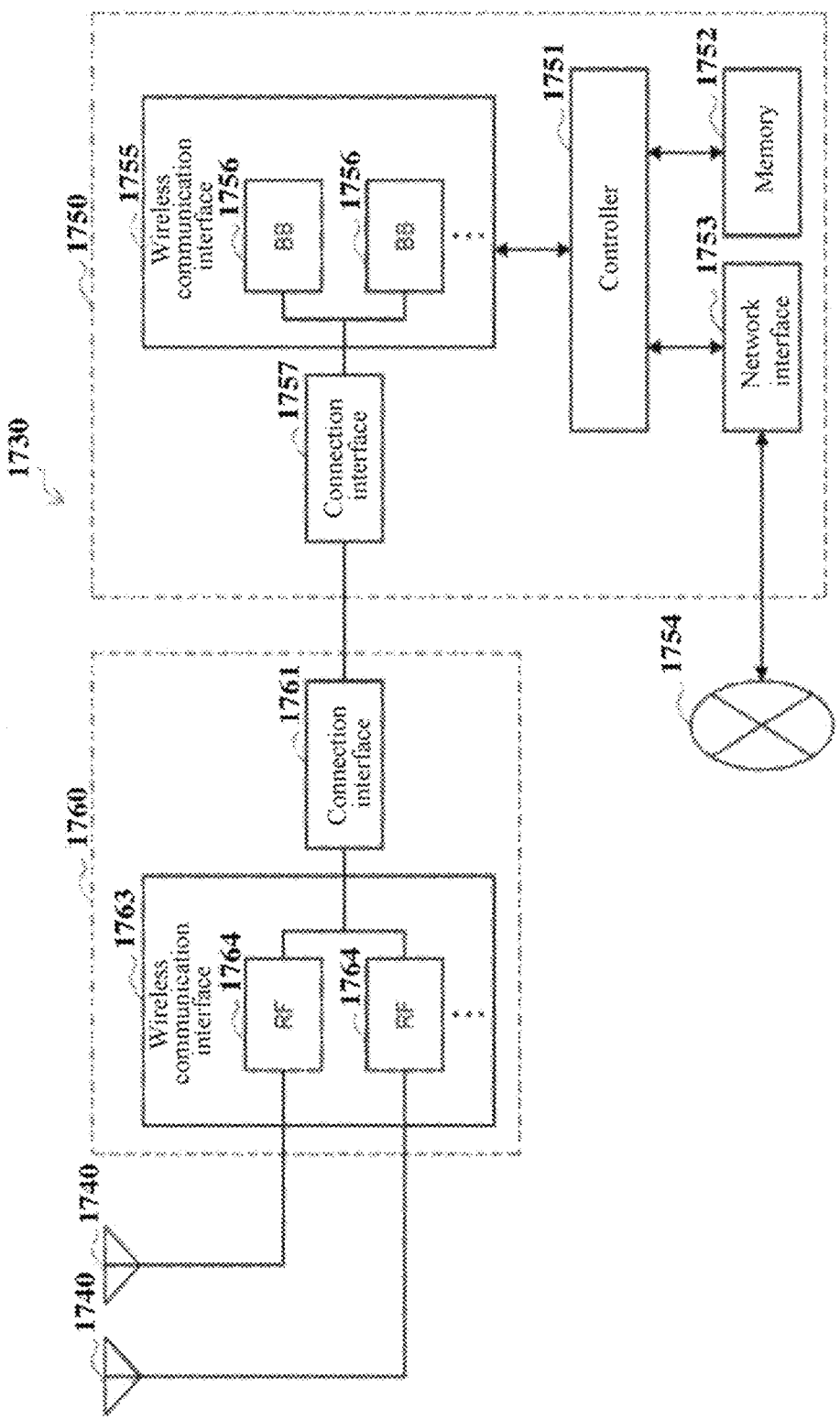
FIG. 17 is a block diagram showing a second example of a schematic configuration of an eNB.

FIG. 17 is a block diagram showing a second example of a schematic configuration of a gNB to which the technology according to the present disclosure may be applied. A gNB 1730 includes one or more antennas 1740, a base station device 1750 and an RRH 1760. Each of the RRH 1760 and the antennas 1740 may be connected to each other via an RF cable. The base station device 1750 and the RRH 1760 may be connected to each other via a high-speed line such as an optical fiber cable.

Each of the antennas 1740 includes a single or multiple antennal elements (such as multiple antenna elements included in an MIMO antenna), and is used for the RRH 1760 to transmit and receive wireless signals. As shown in FIG. 17, the gNB 1730 may include multiple antennas 1740. For example, the multiple antennas 1740 may be compatible with multiple frequency bands used by the gNB 1730. Although FIG. 17 shows the example in which the gNB 1730 includes the multiple antennas 1740, the gNB 1730 may also include a single antenna 1740.

The base station device 1750 includes a controller 1751, a memory 1752, a network interface 1753, a wireless communication interface 1755, and a connection interface 1757. The controller 1751, the memory 1752, and the network interface 1753 are the same as the controller 1621, the memory 1622, and the network interface 1623 described with reference to FIG. 16.

The wireless communication interface 1755 supports any cellular communication scheme (such as LTE and LTE-advanced), and provides wireless communication to a terminal located in a sector corresponding to the RRH 1760 via the RRH 1760 and the antenna 1740. The wireless communication interface 1755 may typically include, for example, a BB processor 1756. Other than connecting to an RF circuit 1764 of the RRH 1760 via the connection interface 1757, the BB processor 1756 is the same as the BB processor 1626 described with reference to FIG. 16. As show in FIG. 17, the wireless communication interface 1755 may include multiple BB processors 1756. For example, the multiple BB processors 1756 may be compatible with the multiple frequency bands used by the gNB 1730. Although FIG. 17 shows the example in which the wireless communication interface 1755 includes the multiple BB processors 1756, the wireless communication interface 1755 may also include a single BB processor 1756.

The connection interface 1757 is an interface for connecting the base station device 1750 (the wireless communication interface 1755) to the RRH 1760. The connection interface 1757 may be a communication module for a communication of the above high-speed line, which is used for connecting the base station device 1750 (the wireless communication interface 1755) to the RRH 1760.

The RRH 1760 includes a connection interface 1761 and a wireless communication interface 1763.

The connection interface 1761 is an interface for connecting the RRH 1760 (the wireless communication interface 1763) to the base station device 1750. The connection interface 1761 may also be a communication module for the communication in the above high-speed line.

The wireless communication interface 1763 transmits and receives wireless signals via the antenna 1740. The wireless communication interface 1763 may typically include, for example, the RF circuit 1764. The RF circuit 1764 may include, for example, a frequency mixer, a filter and an amplifier, and transmits and receives wireless signals via the antenna 1740. As shown in FIG. 17, the wireless communication interface 1763 may include multiple RF circuits 1764. For example, the multiple RF circuits 1764 may support multiple antenna elements. Although FIG. 17 shows the example in which the wireless communication interface 1763 includes the multiple RF circuits 1764, the wireless communication interface 1763 may also include a single RF circuit 1764.

In the gNB 1600 shown in FIG. 16 and the gNB 1730 shown in FIG. 17, the interfered user determination unit 810, the available beam pair determination unit 820, the selection unit 830, the controlling unit 840, the available device determination unit 860 and the available beam determination unit 870 shown in FIG. 8 may be implemented by the controller 1621 and/or the controller 1751. At least a part of the functions may also be implemented by the controller 1621 and the controller 1751. For example, the controller 1621 and/or the controller 1751 may perform the functions of determining an interfered user, determining an available beam pair, selecting an available beam pair, controlling a reflection direction of a passive signal reflection device, determining an available passive signal reflection device for a user equipment and determining available beams of the passive signal reflection device.

The preferred embodiments of the present disclosure are described above with reference to the drawings. Apparently, the present disclosure is not limited to the above embodiments. Those skilled in the art may make various alternations and modifications within the scope of the appended claims, and it should be understood that these alternations and modifications fall within the technical scope of the present disclosure.

For example, the units shown in dashed boxes in the functional block diagrams shown in the drawings indicates that the functional units are optional in the corresponding device, and the various optional functional units may be combined in an appropriate manner to perform desired functions.

For example, the functions included in one unit according to the above embodiments may be realized by separate devices. Alternatively, the functions implemented by multiple units in the above embodiments may be implemented by separate devices, respectively. In addition, one of the above functions may be implemented by multiple units. It should be understood that the above configurations are included in the technical scope of the present disclosure.

In this specification, the steps described in the flowchart may be performed in the chronological order described herein, and may be performed in parallel or independently rather than necessarily in the chronological order. In addition, the chronological order in which the steps are performed may be changed appropriately.

Although the embodiments of the present disclosure have been described above in detail in connection with the drawings, it should be appreciated that the embodiments as described above are merely illustrative rather than limitative of the present disclosure. Those skilled in the art may make various modifications and variations to the above embodiments without departing from the spirit and scope of the disclosure. Therefore, the scope of the present disclosure is defined merely by the appended claims and their equivalents.

The invention claimed is:

1. An electronic device, comprising processing circuitry configured to:
   determine an interfered user based on a plurality of available passive signal reflection devices of a user equipment, wherein the interfered user is interfered by at least one of the available passive signal reflection devices;
   determine a set of available beam pairs based on the plurality of available passive signal reflection devices of the user equipment, wherein two beams in each of the available beam pairs are available beams of two available passive signal reflection devices, respectively;
   select an available beam pair from the set of the available beam pairs based on received signal quality of the user equipment and received signal quality of the interfered user; and
   adjust reflection directions of two available passive signal reflection devices, corresponding to two beams in the selected available beam pair, to be respectively consistent with directions of the two beams, so that the two available passive signal reflection devices reflect signals from the electronic device to the user equipment by using the two beams respectively.

2. The electronic device according to claim 1, wherein the processing circuitry is further configured to:
   determine the plurality of available passive signal reflection devices of the user equipment based on a range of received signals of the user equipment and a range of transmitting signals of the electronic device.

3. The electronic device according to claim 2, wherein the processing circuitry is further configured to:
   determine a plurality of passive signal reflection devices, located in an overlapped region of the range of received signals of the user equipment and the range of transmitting signals of the electronic device, as the plurality of available passive signal reflection devices.

4. The electronic device according to claim 1, wherein the processing circuitry is further configured to:
   determine, for each of the available passive signal reflection devices, an interference range of the available passive signal reflection device based on a range of reflected signals of the available passive signal reflection device and a position of the user equipment; and
   determine the interfered user based on the interference range of each of the available passive signal reflection devices.

5. The electronic device according to claim 4, wherein the processing circuitry is further configured to:
   determine a user within an interference range of one or more available passive signal reflection devices as the interfered user.

6. The electronic device according to claim 1, wherein the processing circuitry is further configured to:
   determine, for each of the available passive signal reflection devices, beams of the available passive signal reflection device which have an overlapped region with a range of reflected signals of another available passive signal reflection device as available beams of the available passive signal reflection device; and determine the set of the available beam pairs based on the available beams of each of the available passive signal reflection devices.

7. The electronic device according to claim 1, wherein the processing circuitry is further configured to perform following operations on each of available beam pairs:

adjusting reflection directions of two available passive signal reflection devices corresponding to two beams in the available beam pair to be respectively consistent with directions of the two beams, and transmitting a downlink signal to the user equipment through each of the two available passive signal reflection devices;

receiving, from the user equipment, the received signal quality of the user equipment; and receiving, from each of interfered users, received signal quality of the interfered user.

8. The electronic device according to claim 7, wherein the processing circuitry is further configured to:

calculate, for each of the available beam pair, a ratio of the received signal quality of the user equipment to a sum of received signal quality of all the interfered users; and select, from the set of the available beam pairs, an available beam pair having a maximum ratio.

9. The electronic device according to claim 1, wherein the processing circuitry is further configured to:

receive, from the user equipment, request information indicating enabling a passive signal reflection device mode, wherein the enabling a passive signal reflection device mode indicates that signals from the electronic device are reflected by the passive signal reflection devices.

10. The electronic device according to claim 1, wherein the passive signal reflection devices are passive electromagnetic signal reflection surfaces.

11. A wireless communication method performed by an electronic device, comprising:

determining an interfered user based on a plurality of available passive signal reflection devices of a user equipment, wherein the interfered user is interfered by at least one of the available passive signal reflection devices;

determining a set of available beam pairs based on the plurality of available passive signal reflection devices of the user equipment, wherein two beams in each of the available beam pairs are available beams of two available passive signal reflection devices, respectively;

selecting an available beam pair from the set of the available beam pairs based on received signal quality of the user equipment and received signal quality of the interfered user; and adjusting reflection directions of two available passive signal reflection devices, corresponding to two beams in the selected available beam pair, to be respectively consistent with directions of the two beams, so that the two available passive signal reflection devices reflect signals from the electronic device to the user equipment by using the two beams respectively.

12. The wireless communication method according to claim 11, further comprising:

determining the plurality of available passive signal reflection devices of the user equipment based on a range of received signals of the user equipment and a range of transmitting signals of the electronic device.

13. The wireless communication method according to claim 12, wherein the determining the plurality of available passive signal reflection devices of the user equipment comprises:

determining, a plurality of passive signal reflection devices, located in an overlapped region of the range of received signals of the user equipment and the range of transmitting signals of the electronic device, as the plurality of available passive signal reflection devices.

14. The wireless communication method of claim 11, wherein the determining an interfered user comprises:

determining, for each of the available passive signal reflection devices, an interference range of the available passive signal reflection device based on a range of reflected signals of the available passive signal reflection device and a position of the user equipment; and determining the interfered user based on the interference range of each of the available passive signal reflection devices.

15. The wireless communication method of claim 14, wherein the determining an interfered user comprises:

determining a user within an interference range of one or more available passive signal reflection devices as the interfered user.

16. The wireless communication method according to claim 11, further comprising:

determining, for each of the available passive signal reflection devices, beams of the available passive signal reflection device which have an overlapped region with a range of reflected signals of another available passive signal reflection device as available beams of the available passive signal reflection device; and determining the set of the available beam pairs based on the available beams of each of the available passive signal reflection devices.

17. The wireless communication method according to claim 11, further comprising:

performing following operations on each of available beam pairs:

respectively adjusting reflection directions of two available passive signal reflection devices corresponding to two beams in the available beam pair to be consistent with directions of the two beams, and transmitting a downlink signal to the user equipment through each of the two available passive signal reflection devices;

receiving, from the user equipment, the received signal quality of the user equipment; and receiving, from each of interfered users, received signal quality of the interfered user.

18. The wireless communication method according to claim 17, wherein the selecting an available beam pair comprises:

calculating, for each of the available beam pair, a ratio of the received signal quality of the user equipment to a sum of received signal quality of all the interfered users; and selecting, from the set of the available beam pairs, an available beam pair having a maximum ratio.

19. The wireless communication method according to claim 11, further comprising:

receiving, from the user equipment, request information indicating enabling a passive signal reflection device mode, wherein the enabling a passive signal reflection device mode indicates that signals from the electronic device are reflected by the passive signal reflection devices.

20. A non-transitory computer-readable storage medium comprising executable computer instructions, wherein the executable computer instructions, when executed by a computer, cause the computer to perform the wireless communication method according to claim 11.

\* \* \* \* \*